(12) United States Patent
Sunagawa et al.

(10) Patent No.: US 11,306,270 B2
(45) Date of Patent: Apr. 19, 2022

(54) LUBRICANT COMPOSITION, METHOD FOR PRODUCING LUBRICANT COMPOSITION, AND CONTINUOUSLY VARIABLE TRANSMISSION

(71) Applicant: IDEMITSU KOSAN CO., LTD., Chiyoda-ku (JP)

(72) Inventors: Yoji Sunagawa, Sodegaura (JP); Takeshi Iwasaki, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 16/633,034

(22) PCT Filed: Jan. 28, 2019

(86) PCT No.: PCT/JP2019/002722
§ 371 (c)(1),
(2) Date: Jan. 22, 2020

(87) PCT Pub. No.: WO2019/146779
PCT Pub. Date: Aug. 1, 2019

(65) Prior Publication Data
US 2020/0208071 A1    Jul. 2, 2020

(30) Foreign Application Priority Data

Jan. 29, 2018 (JP) .............................. JP2018-012777

(51) Int. Cl.
| | | |
|---|---|---|
| *C10M 105/04* | (2006.01) | |
| *C10M 105/34* | (2006.01) | |
| *C10M 105/38* | (2006.01) | |
| *C10M 169/04* | (2006.01) | |
| *C10N 30/02* | (2006.01) | |
| *C10N 40/04* | (2006.01) | |

(52) U.S. Cl.
CPC ........ *C10M 105/04* (2013.01); *C10M 105/34* (2013.01); *C10M 105/38* (2013.01); *C10M 169/04* (2013.01); *C10M 2203/04* (2013.01); *C10M 2203/065* (2013.01); *C10M 2207/2805* (2013.01); *C10N 2030/02* (2013.01); *C10N 2040/04* (2013.01)

(58) Field of Classification Search
CPC .............. C10M 105/04; C10M 105/34; C10M 105/38; C10M 169/04; C10M 2203/04; C10M 2203/065; C10M 2207/2805; C10N 2040/04
See application file for complete search history.

(56) References Cited

U.S. PATENT DOCUMENTS

| | | | | |
|---|---|---|---|---|
| 4,704,215 A | * | 11/1987 | Hata | .................... C10M 169/04 508/192 |
| 4,871,476 A | * | 10/1989 | Yoshimura | ........... C10M 111/04 508/505 |
| 5,126,065 A | | 6/1992 | Tsubouchi et al. | |
| 5,283,384 A | * | 2/1994 | Abe | .................... C10M 171/002 585/22 |
| 6,187,979 B1 | | 2/2001 | Ido et al. | |
| 6,242,393 B1 | * | 6/2001 | Ishida | .................. C10M 105/00 252/73 |
| 2001/0010293 A1 | * | 8/2001 | Ishida | .................. C10M 169/04 208/19 |
| 2004/0014617 A1 | * | 1/2004 | Koga | .................... C10M 111/04 508/463 |
| 2004/0181102 A1 | | 9/2004 | Yoshida et al. | |
| 2007/0155632 A1 | * | 7/2007 | Hata | .................... C10M 169/04 508/258 |
| 2016/0201002 A1 | | 7/2016 | Koga | |

FOREIGN PATENT DOCUMENTS

| | | | | |
|---|---|---|---|---|
| CN | 104204172 | | 12/2014 | |
| DE | 38 41 609 A1 | | 6/1989 | |
| EP | 0968987 A1 | * | 1/2000 | .......... C10M 105/04 |
| EP | 3 766 946 A1 | | 1/2021 | |
| GB | 2224287 A | * | 5/1990 | .......... C10M 105/04 |
| JP | 1-149895 A | | 6/1989 | |
| JP | 3-95295 A | | 4/1991 | |
| JP | 2000-204386 A | | 7/2000 | |
| JP | 2001-294883 A | | 10/2001 | |
| JP | 2002-348584 A | | 12/2002 | |
| JP | 2004-10502 A | | 1/2004 | |
| JP | 2008-037994 | | 2/2008 | |
| WO | WO 00/63323 A1 | | 10/2000 | |
| WO | WO 02/097016 A1 | | 12/2002 | |
| WO | WO 03/014268 A1 | | 2/2003 | |
| WO | WO 2015/045816 A1 | | 4/2015 | |

OTHER PUBLICATIONS

International Search Report dated Mar. 16, 2019 in PCT/JP2019/002722 filed Jan. 28, 2019, 2 pages.
Extended European Search Report dated Sep. 1, 2021 in corresponding European Patent Application No. 19744522.4, 7 pages.
Office Action in Chinese Patent Application No. 201980003763.2 dated Dec. 29, 2021.
Office Action in corresponding Japanese Patent Application No. 2018-012777 dated Jan. 11, 2022 (with English language translation).

\* cited by examiner

*Primary Examiner* — Cephia D Toomer
(74) *Attorney, Agent, or Firm* — Oblon, McClelland, Maier & Neustadt, L.L.P.

(57) ABSTRACT

To provide a lubricating oil composition achieving both of high traction coefficient and excellent low temperature fluidity at a higher level and having a high flash point, which contains a naphthene-based synthetic oil (a) having a flash point of 140° C. or higher, and an ester (b) having 5 to 32 carbon atoms and having a branched chain, wherein the content of the naphthene-based synthetic oil (a) based on the total amount of the composition is 35% by mass or more and less than 80% by mass, a method for producing the lubricating oil composition, and a continuously variable transmission using the lubricating oil composition.

13 Claims, No Drawings ical Field

The present invention relates to a lubricating oil composition, a method for producing a lubricating oil composition, and a continuously variable transmission.

BACKGROUND ART

The transmission of the continuously variable transmission, especially the traction drive system, is smaller in size and lighter in weight than a transmission using a gear, and is capable of shifting without contact between metals, so that noise is hardly generated. Therefore, the transmission of the traction drive system is considered to be applied to an electric vehicle in particular.

The lubricating oil composition used in the transmission of the traction drive system requires low viscosity even under low temperature conditions (for example, about −40° C.), namely low temperature fluidity, in order to ensure low temperature startability in cold districts such as North America and North Europe, together with high traction coefficient under high temperature conditions (for example, about 120° C. for automotive applications), from the viewpoint of securing a large torque transmission capacity. However, since these performances are contradictory, it is difficult to achieve both. As a lubricating oil composition having such a performance, a lubricant base oil composition containing a naphthene-based synthetic lubricant base oil having a predetermined flash point and a paraffin-based synthetic lubricant base oil each at a predetermined content, and further a lubricant base oil composition containing a poly α-olefin have been proposed (for example, PTL 1).

CITATION LIST

Patent Literature

PTL 1: JP 2000-204386 A

SUMMARY OF INVENTION

Technical Problem

In recent years, required performance such as high traction coefficient and low temperature fluidity for lubricating oil compositions for use in continuously variable transmissions for automobiles, especially in the transmissions of the traction drive systems, has become increasingly severe, and the above-mentioned lubricant base oil compositions cannot be applicable in many cases. In addition to performance such as high traction coefficient and low temperature fluidity, a high flash point, for example, a flash point of 140° C. or higher is also required from the viewpoint of handling safety.

The present invention has been made in view of the above circumstances, and an object of the present invention is to provide a lubricating oil composition achieving both of high traction coefficient and excellent low temperature fluidity at a higher level and having a high flash point, a method for producing the lubricating oil composition, and a continuously variable transmission using the lubricating oil composition.

Solution to Problem

As a result of intensive investigations in view of the above-mentioned problems, the present inventors have found that the problems can be solved with a lubricating oil composition obtained by combining a predetermined naphthene-based synthetic oil with an ester at a predetermined content, that is, a lubricating oil composition containing a naphthene-based synthetic oil (a) having a flash point of 140° C. or higher and an ester (b) having 5 to 32 carbon atoms and having a branched chain, wherein the content of the naphthene-based synthetic oil (a) based on the total amount of the composition is 35% by mass or more and less than 80% by mass.

Advantageous Effects of Invention

According to the present invention, it is possible to provide a lubricating oil composition achieving both of high traction coefficient and excellent low temperature fluidity at a higher level and having a high flash point, a method for producing the lubricating oil composition, and a continuously variable transmission using the lubricating oil composition.

DESCRIPTION OF EMBODIMENTS

An embodiment of the present invention (which may be hereinafter simply referred to as a "present embodiment") will be described below. In the description herein, the numerals with "or more", "or less", and "to" relating to the description of numerical ranges are numerical values that can be arbitrarily combined.

[Lubricating Oil Composition]

The lubricating oil composition of the present embodiment contains a naphthene-based synthetic oil (a) having a flash point of 140° C. or higher and an ester (b) having 5 to 32 carbon atoms and having a branched chain, wherein the content of the naphthene-based synthetic oil (a) based on the total amount of the composition is 35% by mass or more and less than 80% by mass. Each component that can be contained in the lubricating oil composition of the present embodiment will be described in detail below.

(Naphthene-Based Synthetic Oil (a))

In the lubricating oil composition of the present embodiment, it is necessary that the content of the naphthene-based synthetic oil (a) having a flash point of 140° C. or higher (which may be hereinafter simply referred to as a "naphthene-based synthetic oil (a)") based on the total amount of the composition is 35% by mass or more and less than 80% by mass. In the lubricating oil composition of the present embodiment, when the content of the naphthene-based synthetic oil (a) based on the total amount of the composition is less than 35% by mass or 80% by mass or more, both of high traction coefficient and excellent low temperature fluidity cannot be achieved at a higher level, and a high flash point cannot be obtained.

In the lubricating oil composition of the present embodiment, the flash point of the naphthene-based synthetic oil (a) needs to be 140° C. or higher. When the flash point is lower than 140° C., a particularly high traction coefficient cannot be obtained, and a lubricating oil composition having a high flash point cannot be obtained. From the viewpoint of improving the traction coefficient and the flash point, the flash point of the naphthene-based synthetic oil (a) is preferably 145° C. or higher, more preferably 150° C. or higher, and still more preferably 160° C. or higher, and the upper limit thereof is not particularly limited, and may be about 200° C. or lower. In the description herein, the flash point is a flash point measured by Cleveland open-cup method in accordance with JIS K2265-4:2007 (Determination of Flash Point-Part 4: Cleveland Open-Cup Method).

The naphthene-based synthetic oil (a) used in the lubricating oil composition of the present embodiment is not particularly limited as long as it has a flash point of 140° C. or higher, but is preferably a synthetic oil having a cyclic structural portion from the viewpoints of achieving both of high traction coefficient and excellent low temperature fluidity at a higher level and improving the flash point, and more preferably a synthetic oil having at least one ring selected from a cyclohexane ring, a bicycloheptane ring, and a bicyclooctane ring. Examples of such a naphthene-based synthetic oil (a) include a synthetic oil represented by the following general formula (1).

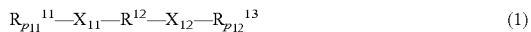
(1)

In the general formula (1), $R^{11}$ and $R^{13}$ each independently represent a monovalent hydrocarbon group, $R^{12}$ represents a divalent hydrocarbon group, $X_{11}$ and $X_{12}$ each independently represent a cyclohexane ring, a bicycloheptane ring, or a bicyclooctane ring, and $p_{11}$ and $p_{12}$ each independently represent an integer of 1 or more and 6 or less.

Examples of the monovalent hydrocarbon group represented by $R^{11}$ and $R^{13}$ include an alkyl group, an alkenyl group, a cycloalkyl group, and an aryl group. Among these monovalent hydrocarbon groups, an alkyl group and an alkenyl group are preferable, and an alkyl group is more preferable from the viewpoints of achieving both of high traction coefficient and excellent low temperature fluidity at a higher level and improving the flash point. Moreover, these monovalent hydrocarbon groups may be linear structure, branched structure, or cyclic structure, and may have a substituent such as a halogen atom or a hydroxy group, and when the monovalent hydrocarbon group is a cycloalkyl group or an aryl group, it may further have a substituent such as an alkyl group.

From the same viewpoint, the number of carbon atoms of the monovalent hydrocarbon group is preferably 1 or more and the upper limit thereof is preferably 12 or less, more preferably 8 or less, still more preferably 4 or less, and particularly preferably 2 or less when the monovalent hydrocarbon is an alkyl group, and it is preferably 2 or more and more preferably 3 or more, and the upper limit is preferably 12 or less, more preferably 8 or less, and still more preferably 4 or less when the monovalent hydrocarbon is an alkenyl group.

$p_{11}$ and $p_{12}$ are each independently an integer of 1 or more and 6 or less, and the upper limit is preferably 4 or less, more preferably 3 or less, and still more preferably 2 or less from the viewpoints of achieving both of high traction coefficient and excellent low temperature fluidity at a higher level and improving the flash point.

The divalent hydrocarbon group represented by $R^{12}$ includes those obtained by removing one hydrogen atom from the monovalent hydrocarbon group represented by $R^{11}$ and $R^{13}$ to form a divalent hydrocarbon group, and is preferably an alkylene group and an alkenylene group, and more preferably an alkylene group, from the viewpoints of achieving both of high traction coefficient and excellent low temperature fluidity at a higher level and improving the flash point.

From the same viewpoint, the number of carbon atoms of the divalent hydrocarbon group represented by $R^{12}$ is 1 or more and the upper limit thereof is preferably 12 or less, more preferably 8 or less, and still more preferably 4 or less.

As the ring of $X_{11}$ and $X_{12}$, from the viewpoints of achieving both of high traction coefficient and excellent low temperature fluidity at a higher level and improving the flash point, a bicycloheptane ring and a bicyclooctane ring are preferable, and a bicycloheptane ring is more preferable.

Examples of the bicycloheptane ring include a bicyclo[2.2.1]heptane ring and a bicyclo[3.3.0]heptane ring. Examples of the bicyclooctane ring include a bicyclo[3.2.1]octane ring and a bicyclo[2.2.2]octane ring. Among these, from the viewpoints of achieving both of high traction coefficient and excellent low temperature fluidity at a higher level and improving the flash point, a bicyclo[2.2.1]heptane ring and a bicyclo[3.3.0]heptane ring are preferable, and a bicyclo[2.2.1]heptane ring is particularly preferable.

Further, these rings may have a monovalent hydrocarbon group represented by $R^{11}$ and $R^{13}$, and may have a substituent such as a hydroxy group and a halogen atom.

In the present embodiment, among the above, from the viewpoints of achieving both of high traction coefficient and excellent low temperature fluidity at a higher level and improving the flash point, it is preferable that $R^{11}$ and $R^{13}$ are each independently an alkyl group or an alkenyl group, and $R^{12}$ is an alkylene group or an alkenylene group, it is more preferable that $R^{11}$ and $R^{13}$ are each independently an alkyl group having 1 to 4 carbon atoms, $R^{12}$ is an alkylene group having 1 to 4 carbon atoms, and $p_{11}$ and $p_{12}$ are each independently 1 or 2, it is still more preferable that $R^{11}$ and $R^{13}$ are each independently an alkyl group having 1 to 4 carbon atoms, $R^{12}$ is an alkylene group having 1 to 4 carbon atoms, $X_{11}$ and $X_{12}$ are a bicycloheptane ring, and $p_{11}$ and $p_{12}$ are each independently 1 or 2, and it is particularly preferable that $R^{11}$ and $R^{13}$ are each independently an alkyl group having 1 to 2 carbon atoms, $R^{12}$ is an alkylene group having 1 to 2 carbon atoms, $X_{11}$ and $X_{12}$ are a bicyclo[2.2.1]heptane ring, and $p_{11}$ and $p_{12}$ are each independently 1 or 2.

The content of the naphthene-based synthetic oil (a) based on the total amount of the composition is required to be 35% by mass or more and less than 80% by mass. When the content of the naphthene-based synthetic oil (a) is less than 35% by mass, high traction coefficient cannot be obtained, and high flash point cannot also be obtained. On the other hand, when the content of the naphthene-based synthetic oil (a) is 80% by mass or more, excellent low temperature fluidity cannot be obtained.

The content of the naphthene-based synthetic oil (a) based on the total amount of the composition is preferably 40% by mass or more, more preferably 45% by mass or more, still more preferably 50% by mass or more, and particularly preferably 60% by mass or more, and the upper limit thereof is preferably 79% by mass or less, more preferably 77% by mass or less, and still more preferably 75% by mass or less, from the viewpoints of achieving both of high traction coefficient and excellent low temperature fluidity at a higher level and improving the flash point. In the present embodiment, the naphthene-based synthetic oil (a) may be used alone or in combination of two or more kinds thereof, and when a plurality thereof are used in combination, the total content of the plural naphthene-based synthetic oils (a) may fall within the range of the above-mentioned content.

(Ester (b) Having 5 to 32 Carbon Atoms and Having a Branched Chain)

The lubricating oil composition of the present embodiment contains an ester (b) having 5 to 32 carbon atoms and having a branched chain (which may be hereinafter simply referred to as "ester (b)"). In the lubricating oil composition of the present embodiment, when the ester (b) is not contained, particularly low temperature fluidity cannot be obtained.

The ester (b) is not particularly limited as long as it has a branched chain, has 5 to 32 carbon atoms, and has an ester structure, and is preferably a monoester represented by the following general formula (2) or a diester represented by the following general formula (3).

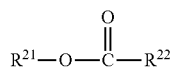

(2)

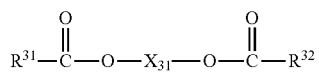

(3)

In the general formula (2), $R^{21}$ and $R^{22}$ each independently represent a branched monovalent hydrocarbon group having 3 or more carbon atoms. In the general formula (3), $R^{31}$ and $R^{32}$ each independently represent a branched monovalent hydrocarbon group having 3 or more carbon atoms, and $X_{31}$ represents a branched divalent hydrocarbon group having 3 or more carbon atoms.

In the general formula (2), examples of the branched monovalent hydrocarbon group having 3 or more carbon atoms represented by $R^{21}$ and $R^{22}$ include a branched group having 3 or more carbon atoms among the groups exemplified as the monovalent hydrocarbon group represented by $R^{11}$ and $R^{13}$ described above. Among them, a branched alkyl group and a branched alkenyl group are preferable, and a branched alkyl group is more preferable from the viewpoints of achieving both of high traction coefficient and excellent low temperature fluidity at a higher level and improving the flash point. The number of carbon atoms is preferably 4 or more, more preferably 5 or more, and still more preferably 6 or more, and the upper limit thereof is preferably 16 or less, more preferably 14 or less, and still more preferably 12 or less.

The monovalent hydrocarbon group represented by $R^{21}$ and $R^{22}$ is preferably a branched group having a gem-dialkyl structure from the viewpoints of achieving both of high traction coefficient and excellent low temperature fluidity at a higher level and improving the flash point. In this case, the number of carbon atoms in the alkyl group in the gem-dialkyl structure is preferably 1 or more, and the upper limit thereof is preferably 4 or less, more preferably 3 or less, and still more preferably 2 or less, and the number of carbon atoms in the two alkyl groups may be the same or different. A particularly preferred gem-dialkyl structure is a gem-dimethyl structure in which the number of carbon atoms in the alkyl group in the structure is 1.

Typical examples of the monovalent hydrocarbon group represented by $R^{21}$ and $R^{22}$ preferably include an isopropyl group, a 1,1-dimethylethyl group, a 2,2-dimethylpropyl group, a 3,3-dimethylbutyl group, a 4,4-dimethylpentyl group, a 5,5-dimethylhexyl group, a 2,4,4-trimethylpentyl group, a 3,5,5-trimethylhexyl group, a 2,2,4,4,6-pentamethylheptyl group, a 2,2,4,6,6-pentamethylheptyl group, and a 3,5,5,7,7-pentamethyloctyl group. It is needless to say that these monovalent hydrocarbon groups are exemplified by typical examples, and in the present embodiment, the isomers of the hydrocarbon group described above may be used as $R^{21}$ and $R^{22}$.

When the ester (b) is a monoester, the number of carbon atoms is preferably 8 or more, more preferably 12 or more, and still more preferably 16 or more, and the upper limit thereof is preferably 30 or less, more preferably 25 or less, and still more preferably 21 or less, from the viewpoints of achieving both of high traction coefficient and excellent low temperature fluidity at a higher level and improving the flash point.

In the general formula (3), examples of the branched monovalent hydrocarbon group having 3 or more carbon atoms represented by $R^{31}$ and $R^{32}$ include the same branched monovalent hydrocarbon group having 3 or more carbon atoms represented by $R^{21}$ and $R^{22}$. Among them, a branched alkyl group and a branched alkenyl group are preferable, and a branched alkyl group is more preferable from the viewpoints of achieving both of high traction coefficient and excellent low temperature fluidity at a higher level and improving the flash point. The upper limit of the number of carbon atoms is preferably 16 or less, more preferably 14 or less, and still more preferably 10 or less.

The divalent hydrocarbon group represented by $X_{31}$ includes those obtained by removing one hydrogen atom from the monovalent hydrocarbon group represented by $R^{31}$ and $R^{32}$ to form a divalent hydrocarbon group, and from the viewpoints of achieving both of high traction coefficient and excellent low temperature fluidity at a higher level and improving the flash point, it is preferably an alkylene group or an alkenylene group, and more preferably an alkylene group, and also preferably has a gem-dialkyl structure as described above with respect to $R^{21}$ and $R^{22}$.

From the same viewpoint, the number of carbon atoms in the divalent hydrocarbon group represented by $X_{31}$ is preferably 4 or more, more preferably 5 or more, and still more preferably 6 or more, and the upper limit thereof is preferably 16 or less, more preferably 14 or less, and still more preferably 12 or less.

When the ester (b) is a diester, the number of carbon atoms is preferably 11 or more, more preferably 12 or more, and still more preferably 14 or more, and the upper limit thereof is preferably 30 or less, more preferably 28 or less, and still more preferably 26 or less, from the viewpoints of achieving both of high traction coefficient and excellent low temperature fluidity at a higher level and improving the flash point.

In the present embodiment, as the diester represented by the general formula (3), among the above, from the viewpoints of achieving both of high traction coefficient and excellent low temperature fluidity at a higher level and improving the flash point, it is preferable that $R^{31}$ and $R^{32}$ are each independently a branched alkyl group or alkenyl group having 3 to 16 carbon atoms, and $X_{31}$ is a branched alkylene group or alkenylene group having 3 to 16 carbon atoms, it is more preferable that $R^{31}$ and $R^{32}$ are each independently a branched alkyl group having 3 to 16 carbon atoms, and $X_{31}$ is a branched alkylene group having 3 to 16 carbon atoms, and it is still more preferable that $R^{31}$ and $R^{32}$ are each independently a branched alkyl group having 3 to 16 carbon atoms and having a gem-dialkyl structure, and $X_{31}$ is a branched alkylene group having 3 to 16 carbon atoms.

The content of the ester (b) based on the total amount of the composition is preferably 10% by mass or more, more preferably 12% by mass or more, still more preferably 15% by mass or more, and particularly preferably 20% by mass or more, and the upper limit thereof is preferably 65% by mass or less, more preferably 60% by mass or less, still more preferably 55% by mass or less, and particularly preferably 50% by mass or less. When the content of the ester (b) is within the above range, both of high traction coefficient and excellent low temperature fluidity can be achieved at a higher level and the flash point can be improved, so that the effect of improving particularly excellent low temperature fluidity can be obtained. In the present embodiment, the ester (b) may be used alone or in combination of two or more kinds thereof, and when a plurality thereof are used in combination, the total content of the plural esters (b) may fall within the range of the above-mentioned content.

(Other Additives)

The lubricating oil composition of the present embodiment contains the naphthene-based synthetic oil (a) and the ester (b) and may be composed of a naphthene-based synthetic oil (a) and an ester (b), or may contain other additives such as a viscosity index improver, a dispersant, an antioxidant, an extreme pressure agent, a metal deactivator, and an anti-foaming agent besides the naphthene-based synthetic oil (a) and the ester (b). These other additives may be used alone or in combination of two or more kinds thereof.

The total content of these other additives may be appropriately determined as desired, and is not particularly limited, but is preferably 0.1 to 20% by mass, more preferably 1 to 15% by mass, and still more preferably 5 to 13% by mass, based on the total amount of the composition, in consideration of the effect of adding other additives.

Examples of the viscosity index improver include polymethacrylates such as a non-dispersion type polymethacrylate or a dispersion type polymethacrylate having a mass average molecular weight (Mw) of preferably 500 to 1,000,000 and more preferably 5,000 to 800,000; and polymers such as an olefinic copolymer (e.g., an ethylene-propylene copolymer), a dispersant-type olefinic copolymer, and a styrenic copolymer (e.g., a styrene-diene copolymer, a styrene-isoprene copolymer) having a mass average molecular weight (Mw) of preferably 800 to 300,000 and more preferably 10,000 to 200,000.

Examples of the dispersant include ash-free dispersants such as boron-free succinimides, boron-containing succinimides, benzylamines, boron-containing benzylamines, succinic esters, and amides of monovalent or divalent carboxylic acid represented by fatty acids or succinic acids.

Examples of the antioxidant include amine-based antioxidants such as diphenylamine-based antioxidants and naphthylamine-based antioxidants; phenol-based antioxidants such as monophenol-based antioxidants, diphenol-based antioxidants, and hindered phenol-based antioxidants; molybdenum-based antioxidants such as molybdenum amine complexes obtained by reacting molybdenum trioxide and/or molybdic acid with an amine compound.

Examples of the extreme pressure agent include sulfur-type extreme pressure agents such as sulfurized oils and fats, sulfurized fatty acids, sulfurized esters, sulfurized olefins, dihydrocarbyl polysulfides, thiadiazole compounds, alkylthiocarbamoyl compounds, and thiocarbamate compounds; phosphorus-based extreme pressure agents such as phosphate, phosphite, acid phosphate, acid phosphite and amine salt thereof, and sulfur-phosphorus-based extreme pressure agents such as zinc dialkylthiocarbamate (Zn-DTC), molybdenum dialkylthiocarbamate (Mo-DTC), zinc dialkyldithiophosphate (Zn-DTP), and molybdenum dialkyldithiophosphate (Mo-DTP).

Examples of the metal deactivator include benzotriazole type, tolyltriazole type, thiadiazole type, and imidazole type compounds. Examples of the anti-foaming agent include silicone oils, fluorosilicone oils, and fluoroalkyl ethers.

(Various Physical Properties of Lubricating Oil Composition)

The kinematic viscosity at 40° C. of the lubricating oil composition of the present embodiment is preferably 3 mm$^2$/s or more and 50 mm$^2$/s or less, more preferably 5 mm$^2$/s or more and 30 mm$^2$/s or less, and still more preferably 10 mm$^2$/s or more and 20 mm$^2$/s or less. The kinematic viscosity at 100° C. of the lubricating oil composition of the present embodiment is preferably 0.5 mm$^2$/s or more and 15 mm$^2$/s or less, more preferably 1 mm$^2$/s or more and 10 mm$^2$/s or less, and still more preferably 1.5 mm$^2$/s or more and 5 mm$^2$/s or less. Further, the viscosity index of the lubricating oil composition of the present embodiment is preferably 75 or more, more preferably 80 or more, and still more preferably 85 or more.

In the description herein, the kinematic viscosity and the viscosity index are values measured by using a glass capillary type viscometer in accordance with JIS K2283:2000.

The Brookfield viscosity (BF viscosity) at −40° C. of the lubricating oil composition of the present embodiment is preferably 15,000 mPa·s or less, more preferably 14,900 mPa·s or less, still more preferably 14,800 mPa·s or less, and particularly preferably 14,750 mPa·s or less. In this manner, the lubricating oil composition of the present embodiment has a low Brookfield viscosity (BF viscosity) at −40° C. and excellent low temperature fluidity.

In the description herein, the Brookfield viscosity (BF viscosity) at −40° C. is measured in accordance with ASTM D2983-09.

In the lubricating oil composition of the present embodiment, the flash point measured by Cleveland open-cup method in accordance with JIS K2265-4:2007 is preferably 140° C. or higher, more preferably 145° C. or higher, still more preferably 150° C. or higher, and particularly preferably 155° C. or higher. In this manner, the lubricating oil composition of the present embodiment has a high flash point, a high flame retardancy, and a high safety.

Further, the traction coefficient at 120° C. of the lubricating oil composition of the present embodiment is preferably 0.050 or more, more preferably 0.053 or more, and still more preferably 0.055 or more. In this manner, the lubricating oil composition of the present embodiment has a high traction coefficient at 120° C., which achieves both of high traction coefficient and excellent low temperature fluidity at a higher level and has a high flash point.

In the description herein, the traction coefficient at 120° C. is a value measured by using a traction coefficient measuring instrument (product name: MTM2 (Mini Traction Machine 2, manufactured by PCS Instruments). Here, the measurement conditions for the traction coefficient at 120° C. are as follows. First, by heating an oil tank with a heater, the oil temperature was set to 140° C., and the traction coefficient at a load of 70N, an average rolling speed of 3.8 m/s, and a slip rate of 5% was measured.

(Use of Lubricating Oil Composition)

The lubricating oil composition of the present embodiment can be suitably used for continuously variable transmissions, continuously variable speed increasers, and continuously variable speed reducers, especially for continuously variable transmission applications. Examples of the continuously variable transmission include a metal belt system, a chain system, and a traction drive system, which are required to have high transmission efficiency and a lubricating oil having a high traction coefficient. In this regard, the lubricating oil composition of the present embodiment can be suitably used for a continuously variable transmission of any type, and in particular, can be suitably used in a transmission of a traction drive system.

Further, since the lubricating oil composition of the present embodiment is excellent in traction coefficient, particularly traction coefficient at high temperature and low temperature fluidity, it can be suitably used as a transmission fluid for a continuously variable transmission in an automobile and an air engine generator, especially for a traction drive system. In addition to the above, the present invention can also be suitably applied to continuously variable transmissions for industrial applications such as a drive unit for a construction machine or an agricultural machine, and a speed increaser for wind power generation, and also to a continuously variable speed increaser and a continuously variable speed reducer.

[Method for Producing Lubricating Oil Composition]

A method for producing a lubricating oil composition of the present embodiment includes blending a naphthene-based synthetic oil (a) having a flash point of 140° C. or higher and an ester (b) having 5 to 32 carbon atoms and having a branched chain, in such a manner that the content of the naphthene-based synthetic oil (a) based on the total amount of the composition is 35% by mass or more and less than 80% by mass.

In the method for producing a lubricating oil composition of the present embodiment, the naphthene-based synthetic oil (a) having a flash point of 140° C. or higher and the ester (b) having 5 to 32 carbon atoms and having a branched chain are the same as those described as the naphthene-based synthetic oil (a) and the ester (b) contained in the lubricating oil composition of the present embodiment, and the contents of the naphthene-based synthetic oil (a) and the ester (b) are the same as those described as the content of the lubricating oil composition of the present embodiment. Further, in the method for producing a lubricating oil composition of the present embodiment, components other than the naphthene-based synthetic oil (a) and the ester (b), for example, additives such as those described above which may be included in the lubricating oil composition of the present embodiment may be blended.

In the production of the lubricating oil composition, the blending order of the naphthene-based synthetic oil (a) and the ester (b) is not particularly limited, and the ester (b) may be added to the naphthene-based synthetic oil (a) or the naphthene-based synthetic oil (a) may be added to the ester (b). Moreover, when blending other additives, various additives used as other additives may be sequentially blended with naphthene-based synthetic oil (a), ester (b), or naphthene-based synthetic oil (a) and ester (b), or the various additives may be blended in advance before blending the above (a) and (b).

[Continuously Variable Transmission]

The continuously variable transmission of the present embodiment includes using a lubricating oil composition which contains a naphthene-based synthetic oil (a) having a flash point of 140° C. or higher and an ester (b) having 5 to 32 carbon atoms and having a branched chain, wherein the content of the naphthene-based synthetic oil (a) based on the total amount of the composition is 35% by mass or more and less than 80% by mass.

The lubricating oil composition used in the continuously variable transmission of the present embodiment is the same as that described as the lubricating oil composition of the present embodiment.

The continuously variable transmission includes a metal belt system, a chain system, a traction drive system, and the like, which may be a continuously variable transmission of any system, and has a feature that a lubricating oil composition used achieves both of high traction coefficient and excellent low temperature fluidity at a higher level and has a high flash point, and is preferably a continuously variable transmission of a traction drive system from the viewpoint of utilizing the feature more effectively.

Examples

The present invention will be described in more detail with reference to examples below, but the present invention is not limited to the examples.

The properties and performance of the lubricating oil composition were measured in the following manner.

(1) Kinematic Viscosity

The kinematic viscosity at 40° C. and 100° C. was measured in accordance with JIS K 2283:2000.

(2) Viscosity Index (VI)

The viscosity index was measured in accordance with JIS K 2283:2000.

(3) Traction Coefficient at 120° C.

The traction coefficient was measured by using the traction coefficient measuring instrument (product name: MTM2 (Mini Traction Machine 2, manufactured by PCS Instruments) under the following conditions. If it is equal to or greater than 0.050, it is acceptable.

Heating condition of oil temperature: 140° C.
Load: 70N
Average rolling speed: 3.8 m/s
Slip rate: 5%

(4) Brookfield Viscosity at −40° C.

The Brookfield viscosity (BF viscosity) at −40° C. was measured in accordance with ASTM D2983-09. If it is equal to or less than 15,000 mPa·s, it is acceptable.

(5) Flash Point

The flash point was measured by Cleveland open-cup method in accordance with JIS K2265-4:2007 (Determination of flash point-Part 4: Cleveland open-cup method). If it is equal to or higher than 140° C., it is acceptable.

(Preparation of Lubricating Oil Compositions of Examples 1 to 5 and Comparative Examples 1 to 5)

Lubricating oil compositions were prepared by blending according to the blending formulation shown in Table 1 below. The evaluation results of properties and performance measured by the above methods for the obtained lubricating oil compositions are shown in Table 1.

TABLE 1

| | | | Example | | | | | Comparative Example | | | | |
|---|---|---|---|---|---|---|---|---|---|---|---|---|
| | | | 1 | 2 | 3 | 4 | 5 | 1 | 2 | 3 | 4 | 5 |
| Blending formulation | Naphthene-based synthetic oil | % by mass | 63.9 | 70.9 | 65.9 | 45.9 | 67.4 | 30.9 | 90.9 | — | — | — |
| | Ester 1 | % by mass | — | 20.0 | — | — | 7.5 | — | — | — | — | — |
| | Ester 2 | % by mass | 27.0 | — | — | — | — | — | — | 90.9 | — | — |

TABLE 1-continued

|  |  |  | Example | | | | | Comparative Example | | | | |
|---|---|---|---|---|---|---|---|---|---|---|---|---|
|  |  |  | 1 | 2 | 3 | 4 | 5 | 1 | 2 | 3 | 4 | 5 |
|  | Ester 3 | % by mass | — | — | 25.0 | — | — | — | — | — | 90.9 | — |
|  | Ester 4 | % by mass | — | — | — | 45,0 | 17.5 | — | — | — | — | 90.9 |
|  | Longifolene | % by mass | — | — | — | — | — | 60.0 | — | — | — | — |
|  | Additive | % by mass | 9.1 | 9.1 | 9.1 | 9.1 | 7.6 | 9.1 | 9.1 | 9.1 | 9.1 | 9.1 |
|  | Total | % by mass | 100.0 | 100.0 | 100.0 | 100.0 | 100.0 | 100.0 | 100.0 | 100.0 | 100.0 | 100.0 |
| Properties, performance | Kinematic viscosity at 40° C. | mm²/s | 11.4 | 19.6 | 13.9 | 14.9 | 17.5 | 16.3 | 18.3 | 11.4 | 12.5 | 13.1 |
|  | Kinematic viscosity at 100° C. | mm²/s | 2.84 | 4.43 | 3.22 | 3.42 | 3.89 | 3.93 | 3.70 | 2.84 | 3.27 | 3.12 |
|  | Viscosity index | — | 90 | 142 | 93 | 104 | 117 | 142 | 77 | 90 | 133 | 97 |
|  | Traction coefficient | — | 0.063 | 0.061 | 0.056 | 0.055 | 0.061 | 0.060 | 0.081 | 0.020 | 0.024 | 0.039 |
|  | Brookfield viscosity | mPa·s | 5,450 | 12,200 | 14,700 | 12,900 | 11,000 | 2,600 | 60,000< | 200 | 2,500 | 8,200 |
|  | Flash point | ° C. | 150 | 158 | 170 | 178 | 166 | 120 | 158 | 130 | 200 | 202 |

The naphthene-based synthetic oil, esters 1 to 4, and longifolene shown in Table 1 used in these examples are those represented by the following chemical formulas.

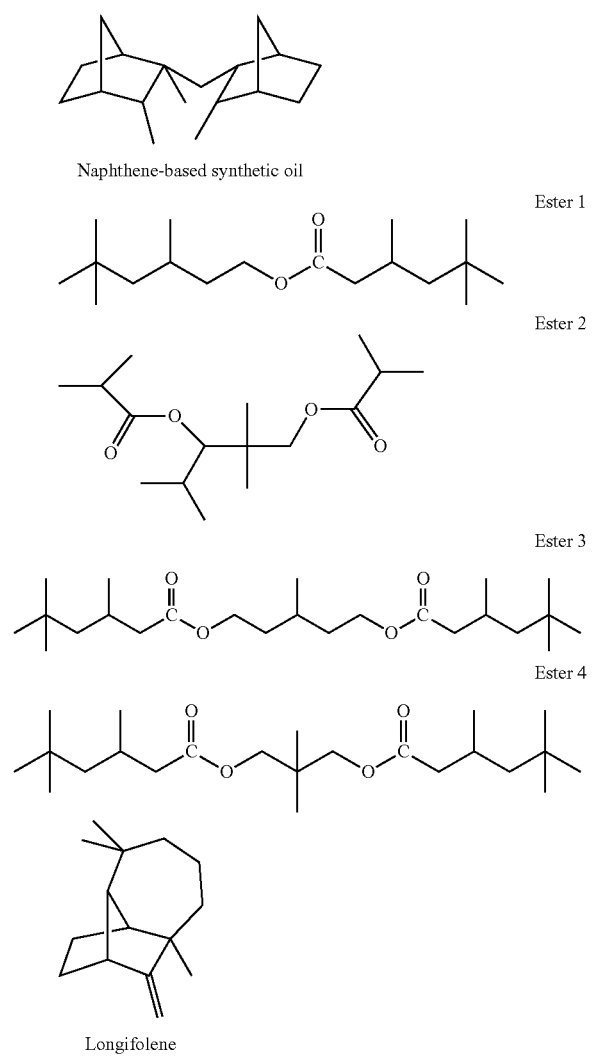

Naphthene-based synthetic oil

Ester 1

Ester 2

Ester 3

Ester 4

Longifolene

Naphthene-based synthetic oil: a synthetic oil represented by the general formula (1), in which $R^{11}$ and $R^{13}$ are a methyl group, $R^{12}$ is a methylene group, $X_{11}$ and $X_{12}$ are a bicyclo[2.2.1]heptane ring, $p_{11}$ is 2, and $p_{12}$ is 1.

Ester 1: a monoester represented by the general formula (2), in which $R^{21}$ is a 3,5,5-trimethylhexyl group and $R^{22}$ is a 2,4,4-trimethylpentyl group.

Ester 2: a diester represented by the general formula (3), in which $R^{31}$ and $R^{32}$ are an isopropyl group and $X_{31}$ is a 2,2,4-trimethylpentyl-1,3-diyl group.

Ester 3: a diester represented by the general formula (3), in which $R^{31}$ and $R^{32}$ are a 2,4,4-trimethylpentyl group and $X_{11}$ is a 3-methylpentyl-1,5-diyl group.

Ester 4: a diester represented by the general formula (3), in which $R^{31}$ and $R^{32}$ are a 2,4,4-trimethylpentyl group and $X_{31}$ is a 2,2-dimethylpropyl-1,3-diyl group.

Additives: viscosity index improver (contains 1.5% by mass as content based on the total amount of the composition in Examples 1 to 4 and Comparative Examples 1 to 5), and, dispersant (succinimide), antioxidant, extreme pressure agent, metal deactivator, and anti-foaming agent.

From the results shown in Table 1, it was confirmed that the lubricating oil compositions of the present embodiment each has a traction coefficient of 0.050 or more, a Brookfield viscosity at −40° C. of 15,000 mPa·s or less, and a flash point of 140° C. or higher, so that the lubricating oil compositions achieve both of high traction coefficient and excellent low temperature fluidity at a higher level, and have a high flash point.

On the other hand, the lubricating oil composition of Comparative Example 1 in which the content of naphthene-based synthetic oil (a) was less than 35%0/by mass and the ester (b) was not contained was found to have a low flash point of 120° C., and the lubricating oil composition of Comparative Example 2 in which the content of naphthene-based synthetic oil (a) was 80% by mass or more was found to have very large Brookfield viscosity at −40° C. of 60,000 mPa·s or more and was inferior in low temperature fluidity. In addition, all of the lubricating oil compositions of Comparative Examples 3 to 5, which did not contain the naphthene-based synthetic oil (a), had a low traction coefficient of less than 0.050, and could not be said to have a high traction coefficient.

The invention claimed is:

1. A lubricating oil composition comprising a naphthene-based synthetic oil (a) having a flash point of 140° C. or higher and an ester (b) having 5 to 32 carbon atoms and having a branched chain, wherein the content of the naphthene-based synthetic oil (a) based on the total amount of the composition is 35% by mass or more and less than 75% by mass, and wherein the naphthene-based synthetic oil (a) is a synthetic oil of formula (1):

$$R_{p_{11}}{}^{11}\text{—}X_{11}\text{—}R^{12}\text{—}X_{12}\text{—}R_{p_{12}}{}^{13} \qquad (1)$$

wherein $R^{11}$ and $R^{13}$ each independently represent a monovalent hydrocarbon group, $R^{12}$ represents a divalent hydrocarbon group, $X_{11}$ and $X_{12}$ each independently represent a cyclohexane ring, a bicycloheptane ring, or a bicyclooctane ring, and $p_{11}$ and $p_{12}$ each independently represent an integer of 1 or more and 6 or less.

2. The lubricating oil composition according to claim 1, wherein $X_{11}$ and $X_{12}$ are each independently a cyclohexane ring, a bicyclo[2.2.1]heptane ring, a bicyclo[3.3.0]heptane ring, a bicyclo[3.2.1]octane ring, or a bicyclo[2.2.2]octane ring.

3. The lubricating oil composition according to claim 1, wherein $R^{11}$ and $R^{13}$ each independently represent an alkyl group or an alkenyl group, and $R^{12}$ represents an alkylene group or an alkenylene group.

4. The lubricating oil composition according to claim 1, wherein $R^{11}$ and $R^{13}$ each independently represent an alkyl group having 1 to 4 carbon atoms, $R^{12}$ represents an alkylene group having 1 to 4 carbon atoms, and $p_{11}$ and $p_{12}$ each independently represent 1 or 2.

5. The lubricating oil composition according to claim 1, wherein the ester (b) is at least one ester selected from a monoester represented by formula (2) and a diester represented by formula (3):

$$R^{21}\text{—}O\text{—}\overset{\overset{\displaystyle O}{\|}}{C}\text{—}R^{22} \qquad (2)$$

$$R^{31}\text{—}\overset{\overset{\displaystyle O}{\|}}{C}\text{—}O\text{—}X_{31}\text{—}O\text{—}\overset{\overset{\displaystyle O}{\|}}{C}\text{—}R^{32} \qquad (3)$$

wherein $R^{21}$ and $R^{22}$ each independently represent a branched monovalent hydrocarbon group having 3 or more carbon atoms, and $R^{31}$ and $R^{32}$ each independently represent a branched monovalent hydrocarbon group having 3 or more carbon atoms and $X_{31}$ represents a branched divalent hydrocarbon group having 3 or more carbon atoms.

6. The lubricating oil composition according to claim 5, wherein the ester (b) is of formula (2) and $R^{11}$ and $R^{22}$ each independently represent a branched alkyl group or alkenyl group having 3 to 16 carbon atoms.

7. The lubricating oil composition according to claim 5, wherein the ester (b) is of formula (3), and $R^{31}$ and $R^{32}$ each independently represent a branched alkyl group or alkenyl group having 3 to 16 carbon atoms, and $X_{31}$ represents a branched alkylene group or alkenylene group having 3 to 16 carbon atoms.

8. The lubricating oil composition according to claim 1, wherein the content of the ester (b) based on the total amount of the composition is 10% by mass or more and 65% by mass or less.

9. The lubricating oil composition according to claim 1, wherein the lubricating oil composition has a Brookfield viscosity at −40° C., measured in accordance with ASTM D2983-09, of 15,000 mPa·s or less.

10. The lubricating oil composition according to claim 1, wherein the lubricating oil composition has a flash point as measured by Cleveland open-cup method in accordance with JIS K2265-4:2007, of 140° C. or higher.

11. A transmission of a traction drive system, comprising the lubricating oil composition according to claim 1.

12. A method for producing a lubricating oil composition, comprising:

blending a naphthene-based synthetic oil (a) having a flash point of 140° C. or higher and an ester (b) having 5 to 32 carbon atoms and having a branched chain, in such a manner that the content of the naphthene-based synthetic oil (a) based on the total amount of the composition is 35% by mass or more and less than 75% by mass;

wherein the naphthene-based synthetic oil (a) is a synthetic oil of formula (1):

$$R_{p_{11}}{}^{11}\text{—}X_{11}\text{—}R^{12}\text{—}X_{12}\text{—}R_{p_{12}}{}^{13} \qquad (1)$$

wherein $R^{11}$ and $R^{13}$ each independently represent a monovalent hydrocarbon group, $R^{12}$ represents a divalent hydrocarbon group, $X_{11}$ and $X_{12}$ each independently represent a cyclohexane ring, a bicycloheptane ring, or a bicyclooctane ring, and $p_{11}$ and $p_{12}$ each independently represent an integer of 1 or more and 6 or less.

13. A continuously variable transmission comprising a lubricating oil composition containing a naphthene-based synthetic oil (a) having a flash point of 140° C. or higher and an ester (b) having 5 to 32 carbon atoms and having a branched chain, wherein the content of the naphthene-based synthetic oil (a) based on the total amount of the composition is 35% by mass or more and less than 75% by mass;

wherein the naphthene-based synthetic oil (a) is a synthetic oil of formula (1):

$$R_{p_{11}}{}^{11}\text{—}X_{11}\text{—}R^{12}\text{—}X_{12}\text{—}R_{p_{12}}{}^{13} \qquad (1)$$

wherein $R^{11}$ and $R^{13}$ each independently represent a monovalent hydrocarbon group, represents a divalent hydrocarbon group, $X_{11}$ and $X_{12}$ each independently represent a cyclohexane ring, a bicycloheptane ring, or a bicyclooctane ring, and $p_{11}$ and $p_{12}$ each independently represent an integer of 1 or more and 6 or less.

\* \* \* \* \*

UNITED STATES PATENT AND TRADEMARK OFFICE
CERTIFICATE OF CORRECTION

PATENT NO. : 11,306,270 B2
APPLICATION NO. : 16/633034
DATED : April 19, 2022
INVENTOR(S) : Yoji Sunagawa et al.

It is certified that error appears in the above-identified patent and that said Letters Patent is hereby corrected as shown below:

In the Claims

Column 13, Claim 1, Line 6:
"$R_{p11}{}^{11} - X_{11} - R^{12} - X_{12} - R_{p12}{}^{13}$ (1)"
Should read:

-- $R^{11}{}_{p11} - X_{11} - R^{12} - X_{12} - R^{13}{}_{p12}$   (1) --

Column 14, Claim 12, Line 29:
"$R_{p11}{}^{11} - X_{11} - R^{12} - X_{12} - R_{p12}{}^{13}$ (1)"
Should read:

-- $R^{11}{}_{p11} - X_{11} - R^{12} - X_{12} - R^{13}{}_{p12}$   (1) --

Column 14, Claim 13, Line 47:
"$R_{p11}{}^{11} - X_{11} - R^{12} - X_{12} - R_{p12}{}^{13}$ (1)"
Should read:

-- $R^{11}{}_{p11} - X_{11} - R^{12} - X_{12} - R^{13}{}_{p12}$   (1) --

Column 14, Claim 13, Line 49:
"monovalent hydrocarbon group, represents a divalent"
Should read:
-- monovalent hydrocarbon group, $R^{12}$ represents a divalent --

Signed and Sealed this
Fifth Day of July, 2022

Katherine Kelly Vidal
*Director of the United States Patent and Trademark Office*